Figure 12:
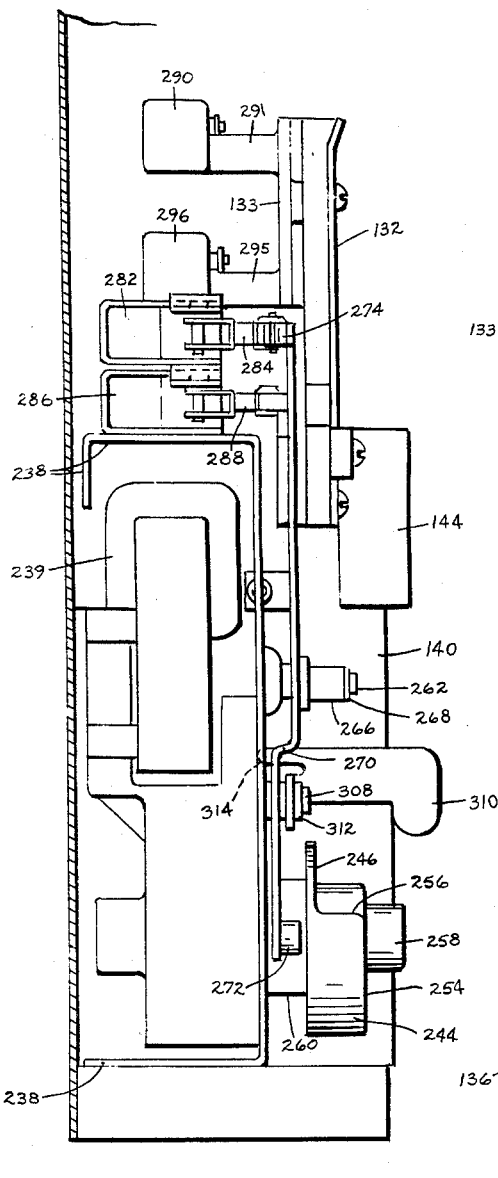

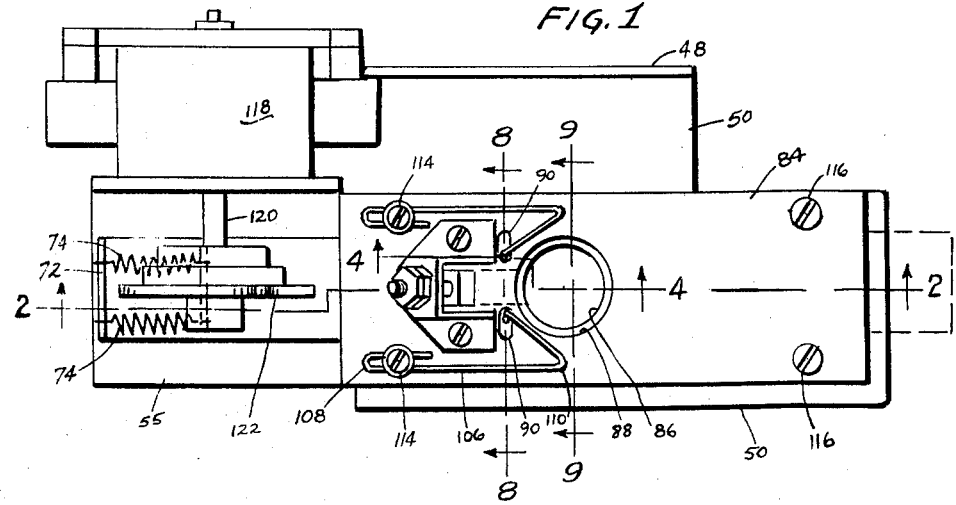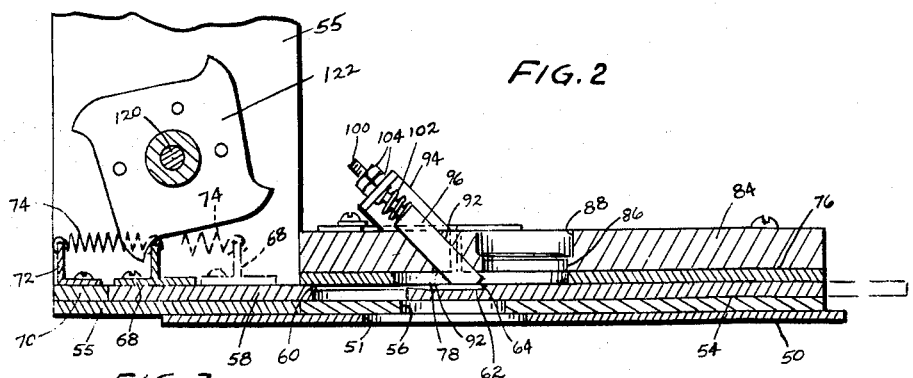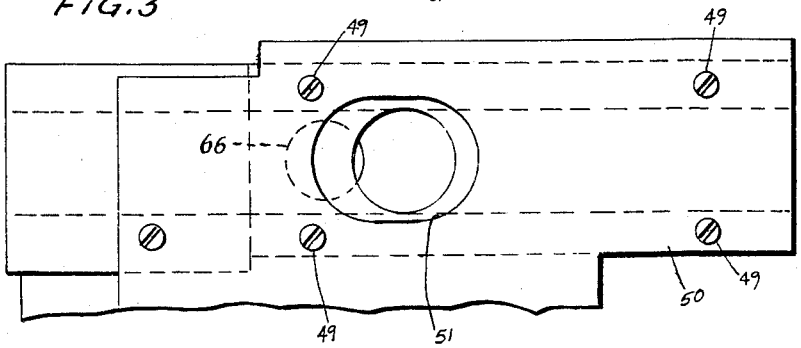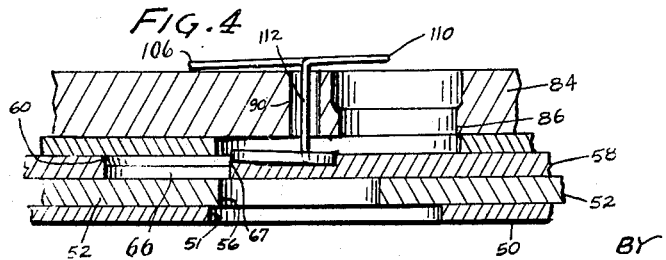

Nov. 2, 1965    E. L. HEIM ETAL    3,215,151
COIN SEPARATORS
Filed June 13, 1960    6 Sheets-Sheet 2
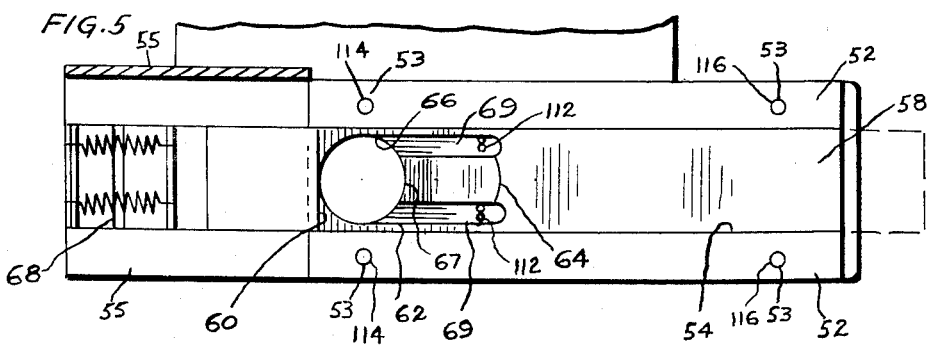
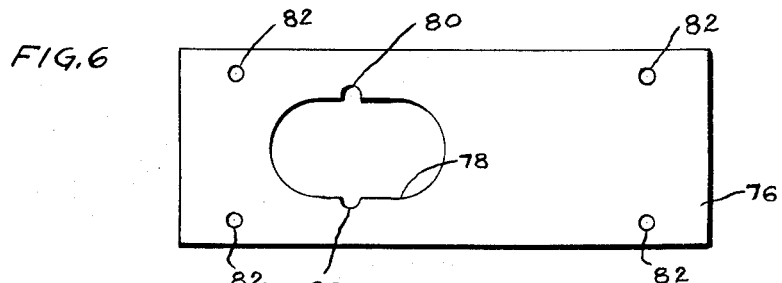
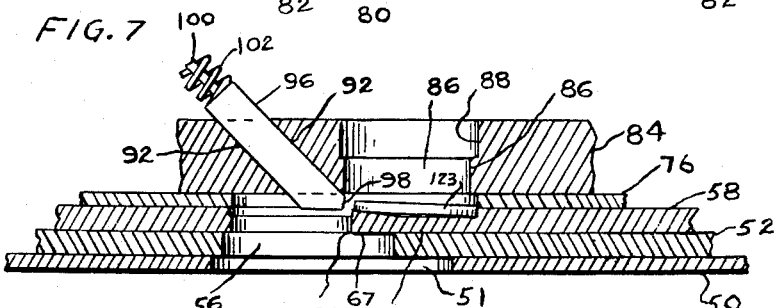
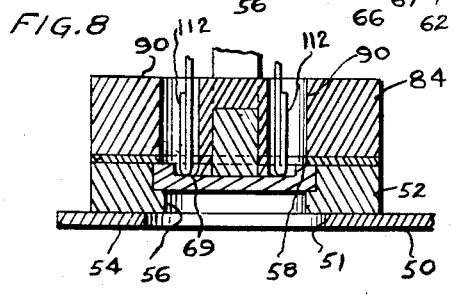
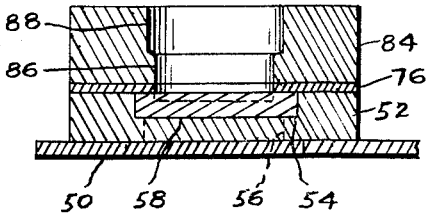
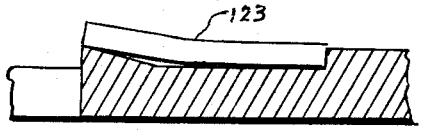
INVENTORS
EDWARD L. HEIM
FRANCIS T. VACCARO
BY Ray Eilers ATT'Y.

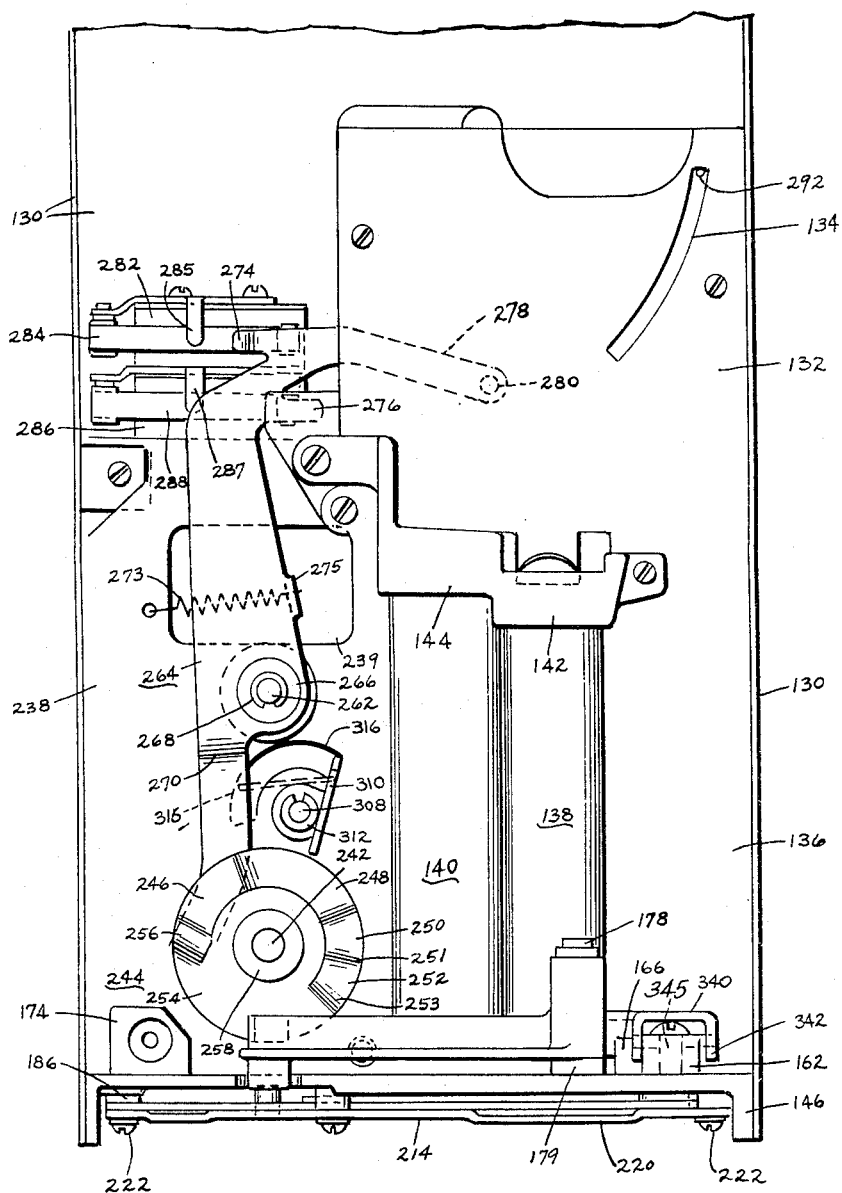

Nov. 2, 1965 E. L. HEIM ETAL 3,215,151
COIN SEPARATORS
Filed June 13, 1960 6 Sheets-Sheet 4

INVENTORS
EDWARD L. HEIM
FRANCIS T. VACCARO
BY Rey Eilers ATT'Y.

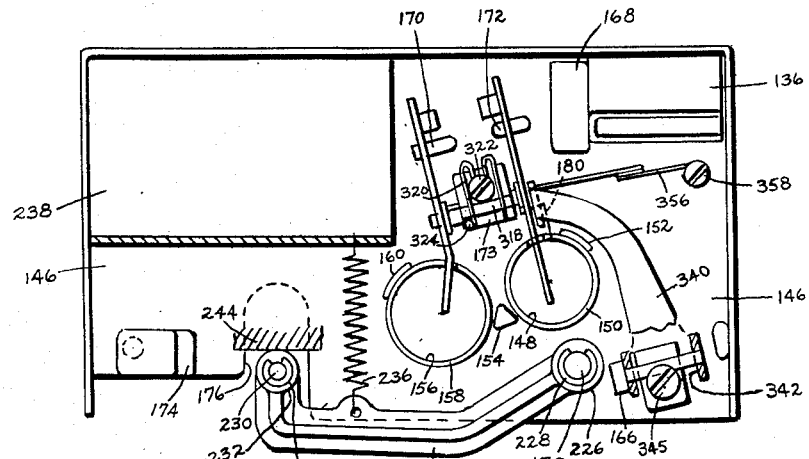

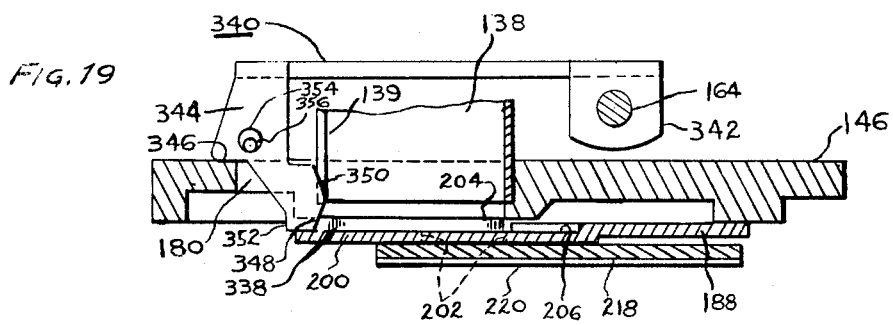
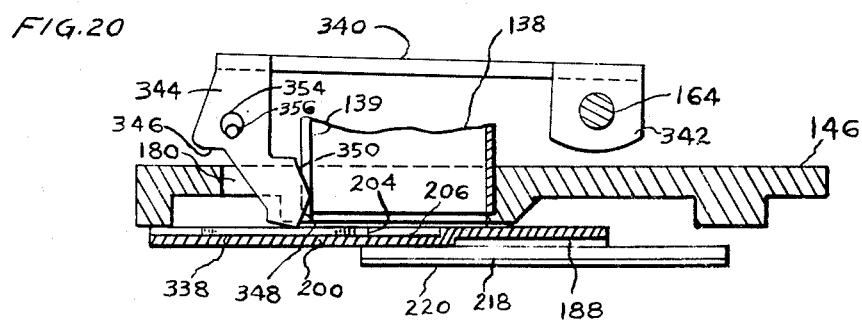
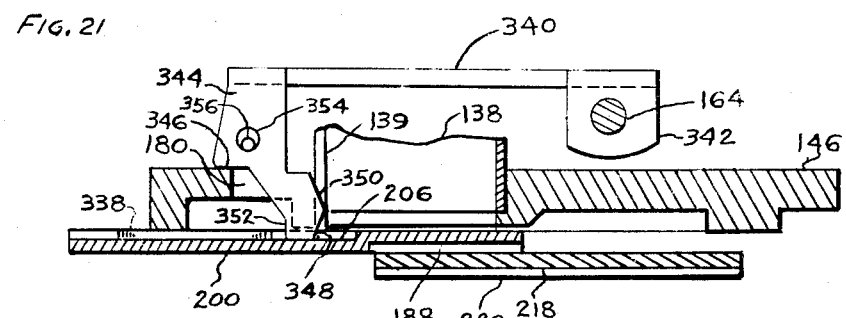
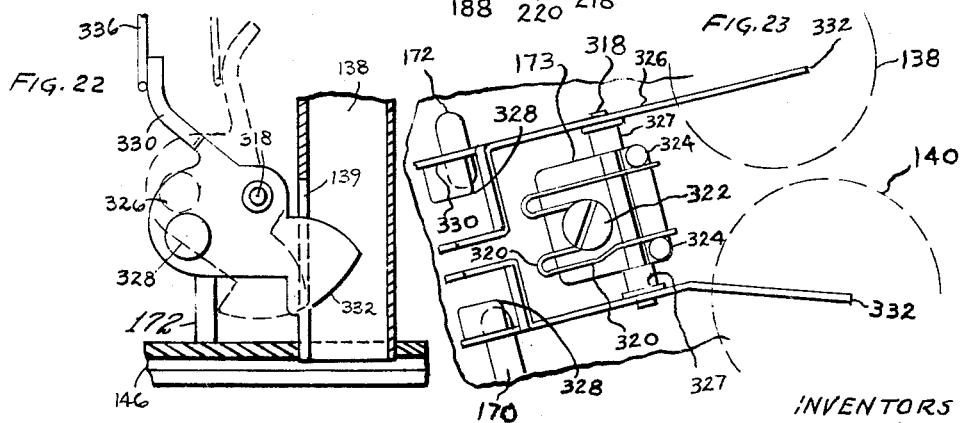

3,215,151
COIN SEPARATORS
Edward L. Heim, Florissant, and Francis T. Vaccaro, Pagedale, Mo., assignors to National Rejectors, Inc., St. Louis, Mo., a corporation of Missouri
Filed June 13, 1960, Ser. No. 35,823
16 Claims. (Cl. 133—5)

This invention relates to improvements in coin separators. More particularly, this invention relates to improvements in devices that can dispense coins.

It is therefore an object of the present invention to provide an improved device that can dispense coins.

It is frequently desirable to dispense coins; and a number of devices have been proposed to effect the dispensing of coins. Where the coins to be dispensed are thick and are strongly resistant to deformation, it is not overly difficult to construct and to operate devices that will dispense such coins. For example, where the coins to be dispensed are United States half-dollars, quarters, nickels or pennies, it is not overly difficult to construct and to operate devices that will dispense such coins. However, where the coins to be dispensed are thin and are readily deformed, it is quite difficult to construct and to operate devices that will dispense such coins. For example, where the coins to be dispensed are United States dimes or Venezuelan bolivars, it is quite difficult to construct and to operate devices that will dispense such coins. The fact that dimes and bolivars are quite thin makes it quite difficult to avoid the occasional dispensing of two coins when just one such coin should be dispensed. The fact that dimes and bolivars are readily deformed makes it quite difficult to keep such coins from jamming within the coin-dispensing devices. It would be desirable to provide a coin-dispensing device which could dispense thin coins, even though those coins were not wholly free from deformation, and that could dispense those coins without ever dispensing two coins when just one coin should be dispensed. The present invention provides such a coin-dispensing device; and it is therefore an object of the present invention to provide a coin-dispensing device that can dispense thin coins, even though those coins are not wholly free from deformation, and that can dispense those coins without ever dispensing two coins when just one coin should be dispensed.

In dispensing just one coin at a time from a stack of coins held within a coin storage tube, it is customary to space the oulet end of that tube from an adjacent coin-supporting surface a distance just slightly greater than the thickness of a freshly minted coin and to provide a coin ejector that is thinner than that coin. Where the first coin to be dispensed is a freshly minted coin, and where the second coin to be dispensed is also a freshly minted coin, the outlet end of the tube will lie in the path of that second coin and will hold that second coin within the tube as the ejector forces the first coin to move outwardly past the outlet end of that tube. Also where the first coin to be dispensed is freshly minted, the ejector can be made much thinner than that coin and still have sufficient thickness to apply full ejecting forces to that first coin. Even where the first and the second coins are not freshly minted, and are thus not of full thickness, the outlet end of the tube will still lie in the path of that second coin and will still hold that second coin within the tube as the ejector forces the first coin to move outwardly past the outlet end of the tube if those coins are thick coins; because thickness variations in the order of a few thousandths of an inch can not reduce the total thickness of the first two coins to a value less than the distance between the outlet end of the coin tube and the adjacent coin-supporting surface. However, where the first and the second coins are thin coins and are not freshly minted, the outlet end of the tube may not lie in the path of that second coin and thus may not hold that second coin within the tube as the ejector forces the first coin to move outwardly beyond the outlet end of the tube, because thickness variations in the order of a few thousandths of an inch can reduce the total thickness of the first two coins to a value less than the distance between the outlet end of the coin tube and the adjacent coin-supporting surface. For this reason it is not practical, where thin coins are to be dispensed, to rely upon the outlet end of the coin storage tube to block the movement of the second coin. The present invention obviates all need of relying upon the outlet end of the coin storage tube to block the movement of the second coin; and it does so by providing a stop that extends beyond the outlet end of the tube. That stop is mounted so it can be displaced when a sizeable force is applied to its leading edge but is mounted so it will not be displaced unless a sizeable force is applied to that leading edge. The ejector will apply sizeable forces to the first coin, and thus enable that coin to displace the stop and to move past that stop, but the second coin will not have sizeable forces applied to it and will thus not be able to apply sizeable forces to the stop. Hence the stop will block any movement of the second coin within the tube. In this way, the present invention positively prevents the dispensing of two coins when just one coin at a time is to be dispensed. It is therefore an object of the present invention to provide a stop that extends beyond the outlet end of the tube and that is mounted so it can be displaced when a sizeable force is applied to its leading edge.

One face of the stop will be disposed immediately adjacent the coin-supporting surface, and hence even the thinnest coin will be unable to pass between that stop and that coin-supporting surface without displacing that stop. As a result, each and every coin that is ejected from the tube will have to engage and displace the stop; and that stop will move just far enough to permit just one coin to pass by that stop. The various coins will have different thicknesses, and hence the stop will be displaced different distances by those various coins. In this way, the stop provided by the present invention directly and fully compensates for variations in the thicknesses of coins, irrespective of the thinness of those coins. It is therefore an object of the present invention to provide a stop that must be displaced by every coin that is ejected from the tube and that will be displaced different distances by coins having different thicknesses.

The use of the stop provided by the present invention makes it possible to space the outlet end of the tube considerable distances away from the adjacent coin-supporting surface. This is very important because it keeps bent or deformed coins from becoming jammed between that outlet end and that coin-supporting surface. Such jamming has been a serious problem of long standing in the dispensing of thin coins, but the stop provided by the present invention completely eliminates that problem.

After the ejector moves the first coin past the stop provided by the present invention, that ejector must return to its normal position. As it does so, that ejector may tend to carry the first coin back with it. It would be very objectionable to permit that first coin to be carried back by the ejector; and the present invention positively keeps that ejector from carrying that first coin back with it. The present invention does so by providing a stripper that interposes itself between the first coin and the outlet opening of the coin tube as the ejector moves that coin away from that outlet end. That stripper will positively overcome any tendency of the returning ejector to carry that first coin back with it; and, instead, that stripper will hold that coin until the ejector moves away from that coin and thereby permits that coin to be dispensed. It is therefore an object of the present invention to provide a stripper that interposes itself between the first coin and the outlet opening of the coin tube as the ejector moves that coin away from that outlet end.

Thin coins that are bent or deformed are particularly difficult to dispense, because such coins can tilt away from the coin-driving surface on the ejector. The present invention makes it possible to assure full and positive dispensing of such coins by providing a projection on the ejector adjacent the leading edge of that ejector. That projection coacts with other portions of the surface of the ejector to provide three-point support for the coins; and that three-point support prevents any tilting of the coins away from the coin-driving surface on the ejector. It is therefore an object of the present invention to provide a projection on the ejector adjacent the leading edge of that ejector which can coact with other portions of the surface of the ejector to provide three-point support for the coins.

The coin-driving surfaces on ejectors used to dispense thin coins must be quite shallow, and dirt can readily collect adjacent those surfaces and tend to cause coins to ride up and over those surfaces. Any such riding up is objectionable; and the present invention obviates any such riding up by providing holes in the ejector adjacent the coin-driving surface. Any dirt that tends to collect adjacent the coin-driving surface on the ejector will be engaged by coins to be ejected and will be caused to work through the holes in that ejector; and hence that coin-driving surface will remain clean. It is therefore an object of the present invention to provide holes in the ejector adjacent the coin-driving surface of that ejector.

It is frequently desirable to use an electric motor to drive the ejector of a coin-dispensing device. However, where a motor is used, it is occasionally possible for persons to recurrently de-energize and re-energize that motor by recurrently pulling the vending machine plug from the electric socket and then re-inserting that plug in that socket. Where the motor drives a cam to drive the ejector in one direction and where a spring drives that ejector in the opposite direction, a person can sometimes get the motor to drive the ejector a short distance and then get the spring to drive that ejector back an equal distance. If that person could get the ejector to reciprocate while that ejector was adjacent the coin storage tube, he might cause that ejector to dispense coins from the tube. Any such dispensing of coins would be very undesirable. The present invention utilizes a motor to drive a cam that, in turn, drives the ejector in one direction and also utilizes a spring to drive that ejector in the opposite direction, and yet the present invention completely prevents persons from effecting the dispensing of coins by recurrent de-energizations and re-energizations of that motor. The present invention attains this desirable result by subdividing the rise of the cam into a series of rises and by interposing dwells between those rises. Those dwells keep the spring from moving the ejector far enough in the opposite direction to dispense coins. It is therefore an object of the present invention to subdivide the rise of a cam into a series of rises and to interpose dwells between those rises.

It is frequently desirable, in coin-dispensing devices, to remove all coins from the coin storage tubes so those coins can be counted. In at least one coin-dispensing device, a manually-operated switch is provided for the sole purpose of holding the motor energized until all of the coins are dispensed. The cost of that switch is a not inconsiderable cost, and the cost of wiring that switch into the motor circuit is a still further cost. It would be desirable to provide a coin-dispensing device wherein a manually-operated switch was not needed to cause the motor to dispense all of the coins in the coin storage tube; and the present invention provides such a coin-dispensing device. In that device, a lever can be shifted to selectively lock the motor-running switch in closed position. It is therefore an object of the present invention to provide a coin-dispensing device wherein a lever can be shifted to selectively lock the motor-running switch in closed position.

In making coin-dispensing devices, it is frequently necessary to make the ejectors so they are long. It would be desirable to minimize the warping and twisting forces that are applied to those ejectors, because any warping or twisting of those ejectors can lead to improper operation of the coin-dispensing devices. The present invention minimizes the warping and twisting forces that are applied to the ejector of a coin-dispenser by applying those forces to an actuating arm and by then connecting that arm to that ejector by means of a pin. It is therefore an object of the present invention to provide a coin-dispensing device wherein the warping and twisting forces are applied to an actuating arm and wherein that actuating arm is connected to the ejector by means of a pin.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that invention will be defined by the appended claims.

Figure 13:
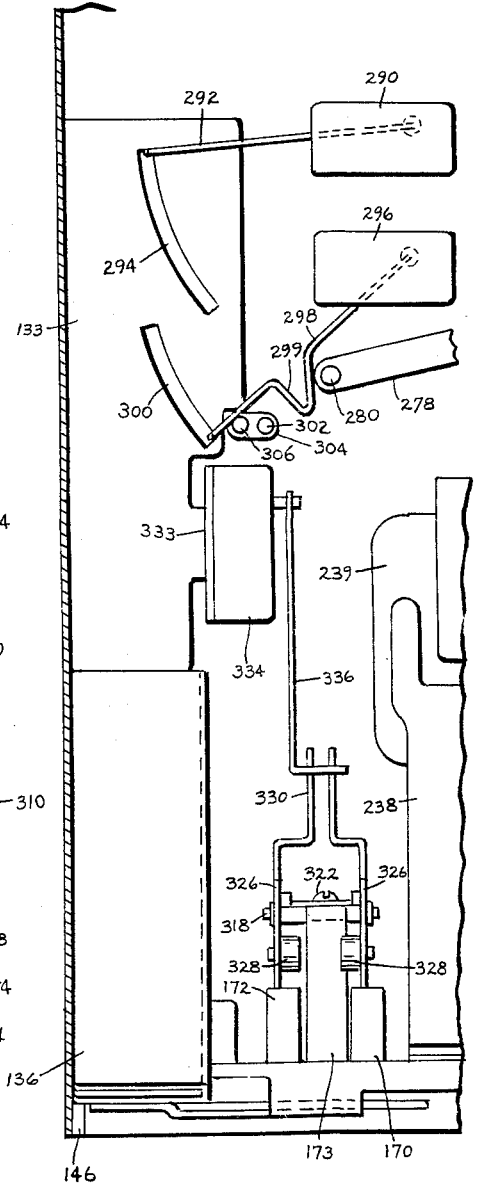

In the drawing, FIG. 1 is a plan view of one preferred embodiment of coin-dispensing device that is made in accordance with the principles and teachings of the present invention, FIG. 2 is a sectional view through the coin-dispensing device of FIG. 1, and it is taken along the plane indicated by the line 2—2 in FIG. 1, FIG. 3 is a plan view of the coin-dispensing device of FIG. 1, as that coin-dispensing device appears after it has been rotated one hundred and eighty degrees about its front edge, FIG. 4 is a sectional view, on a larger scale, and it is taken along the broken plane indicated by the broken line 4—4 in FIG. 1, FIG. 5 is a partially-sectioned plan view of the ejector of the coin-dispensing device of FIG. 1 and of the recessed block in which that ejector is held, FIG. 6 is a plan view of a plate that overlies the ejector and recessed block of FIG. 5, FIG. 7 is a sectional view, on a larger scale, of part of the coin-dispensing device of FIG. 1, and it is taken along the plane indicated by the line 2—2 in FIG. 1, FIG. 8 is a sectional view, on a larger scale, through the coin-dispensing device of FIG. 1, and it is taken along the plane indicated by the line 8—8 in FIG. 1, FIG. 9 is a sectional view, on a larger scale, through the coin-dispensing device of FIG. 1, and it is taken along the plane indicated by the line 9—9 in FIG. 1, FIG. 10 is a sectional view, on a still larger scale, through the ejector of the coin-dispensing device of FIG. 1, and it shows a coin resting upon that ejector, FIG. 11 is a front elevational view of the lower portion of another preferred embodiment of coin-dispensing device that is made in accordance with the principles and teachings of the present invention, FIG. 12 is a partially-sectioned side view of the lower portion of the coin-dispensing device shown in FIG. 11, FIG. 13 is a rear elevational view of one part of the lower portion of the coin-dispensing device shown in FIG. 11, FIG. 14 is a partially-sectioned, plan view that shows the base of the coin-dispensing device of FIG. 11 and some of the parts associated with that base, FIG. 15 is a partially-sectioned, plan view that shows the ejector of the coin-dispensing device of FIG. 11, FIG. 16 is a sectional view, on a larger scale, through the ejector of FIG. 15, and it is taken along the plane indicated by the line 16—16 in FIG. 15, FIG. 17 is a partially-sectioned plan view that shows the bottom plate of the coin-dispensing device of FIG. 11, FIG. 18 is a plan view of part of the base plate of FIG. 14 after that base plate has been rotated one hundred and eighty degrees about its rear edge, FIG. 19 is a sectional view, on a still larger scale, through the bottom portion of the coin-dispensing device of FIG. 11, and it is taken along a surface that is generally indicated by the curved line 19—19 in FIG. 15, FIG. 20 is a sectional view that is similar to FIG. 19, but it shows the free end of the pivoted lever resting upon a coin, FIG. 21 is a sectional view that is similar to FIG. 19, but it shows the free end of the pivoted lever in position to block any returning movement of the coin, FIG. 22 is a sectional view through the lower end of one of the coin storage tubes of the coin-dispensing device of FIG. 11, and FIG. 23 is a plan view, on a still larger scale, of the feelers used in the coin-dispensing device of FIG. 11.

Referring to FIGS. 1–10 in detail, the numeral 50 denotes a supporting plate for one embodiment of coin-dispensing device that is made in accordance with the principles and teachings of the present invention. That supporting plate has an opening 51 therein, and that opening is longer and wider than the coins which are to be dispensed. Such an opening keeps coins from hanging in that opening. The plate 50 has a stiffening flange 48 that projects upwardly from the rear edge of that plate.

The numeral 52 denotes a block that is disposed atop the upper surface of the plate 50, and that block has threaded openings 53 therein to accommodate the shanks of fasteners. That block also has threaded openings, not shown, which can accommodate fasteners 49 that extend upwardly through openings in the supporting plate 50 and seat in those threaded openings. An elongated recess 54 is provided in the upper face of the block 52, and that recess extends longitudinally of that block. A vertically-directed opening 56 is provided in the block 52, and that opening is contiguous with the recess 54. That opening is in register with, although it is smaller than, the opening 51 in the supporting plate 50.

A thin plate 55 is secured to that portion of the supporting plate 50 which projects beyond the left-hand end of the recessed block 52. The top of the plate 55 is flush with the recess 54 in the plate 52, and it acts as an extension of that recess.

An elongated slide 58 is disposed within, and guided by, the recess 54; and that slide has a portion 62 of reduced thickness. The upper surface of the portion 62 is spaced below the upper surface of the slide 58 a distance less than the thickness of a coin to be dispensed by that slide. The right-hand end of that reduced-thickness portion is defined by an arcuate shoulder 64, and the left-hand end of that reduced-thickness portion is defined by a straight shoulder 60. The shoulder 64 has a radius which is greater than the radius of the opening 56 in the block 52. The slide 58 has an opening 66 therein; and it has a ramp-like projection 67 adjacent the right-hand side of that opening. The slide 58 also has two longitudinally-extending recesses 69 in the upper face thereof, and those recesses are contiguous with the opening 66. The right-hand ends of those recesses extend beyond the arcuate shoulder 64, as shown by FIG. 5.

A T-shaped bracket 68 is mounted adjacent the left-hand end of the slide 58, and that bracket is inverted so the cap thereof abuts the top of the slide 58. That cap is suitably secured to the slide 58, adjacent the left-hand end of that slide, by fasteners.

A bar 70 of rubber or other resilient material is mounted on the plate 55 adjacent the left-hand end of that plate; and an L-shaped bracket 72 is mounted atop that resilient bar. The resilient bar 70 is in register with the left-hand end of the slide 58, and it will act as a stop which will limit movement of the slide 58 to the left and which will cushion the stopping of that slide. The slide 58 is biased for movement to the left by a pair of helical extension springs 74; each spring having one end thereof hooked through an opening in the stem of the T-shaped bracket 68 and having the other end hooked through an opening in the L-shaped bracket 72. However, the springs 74 can yield to permit the slide 58 to be moved to the right.

The numeral 76 denotes a thin plate that is disposed above, and that rests upon, the elongated sides of the recessed block 52. That plate has an elongated opening 78 therein, and that opening has rounded ends. That opening is as wide as the opening 66 in the slide 58; and notches 80 in that plate serve to widen the opening 78 even further. Fastener-receiving openings 82 are provided in the plate 76 adjacent the four corners of that plate. The plate 76 will overlie the slide 58 as well as the sides of the recessed block 52, and it will help confine coins that are being moved by the slide 58.

The numeral 84 denotes the top plate for the coin-dispensing device of FIGS. 1–10, and that plate rests upon the thin plate 76. A vertically-directed, cylindrical opening 86 is provided in the top plate 84, and that opening is displaced to the right of the opening 56 in the block 52, as shown particularly by FIG. 4. The opening 86 has a diameter which is just slightly larger than the diameter of the coins to be dispensed by the coin-dispensing device. An enlarged diameter upper portion 88 is provided for the opening 86, and that enlarged diameter upper portion can accommodate the lower end of a coin storage tube, not shown, in which the coins that are to be dispensed can be stored.

The top plate 84 also has two vertically-directed openings 90 therein, and those openings are elongated in a direction transverse of that plate. Those openings are disposed on opposite sides of the axial center line of the plate 84. In addition, the plate 84 has an opening 92 therein; and that opening inclines from upper left to lower right, as the plate 84 is viewed in FIGS. 2 and 7. A generally U-shaped bracket 94 is secured to the top plate 84 adjacent the inclined opening 92; and that bracket has an opening therein which is in register with the inclined opening 92.

A stop 96 is disposed within the opening 92, and that stop is slidable relative to that opening. Both the opening 92 and the stop 96 are square in cross section, and hence that stop can not turn in that opening. Instead, that stop can only reciprocate along a fixed path relative to the opening 92. The bottom face of the stop is cut away at an angle, so that when the stop 96 is disposed within the inclined opening 92, the bottom face of that stop will be horizontal. A coin-receiving leading edge 98 is provided for the stop 96, and that leading edge inclines from lower left to upper right. A pin 100 projects upwardly from the upper face of the stop 96, and that pin extends through the opening in the U-shaped bracket 94. A helical spring 102 encircles that portion of the pin 100 which is intermediate the stop 96 and the opening in the U-shaped bracket 94. That spring biases the stop 96 for movement downwardly and to the right in FIGS. 2 and 7; but nuts 104, which are threaded onto that portion of the pin 100 which projects upwardly beyond the U-shaped bracket 94, engage that bracket and limit the extent to which the stop 96 can move downwardly and to the right. The nuts 104 are preferably set so the bottom face of the stop 96 is substantially at the level of the upper edge of the ramp-like projection 67 on the slide 58.

The numeral 106 denotes two springs that are preferably wires which have been bent into the form shown. Each spring 106 has an open re-entrant bend 108, each spring has an acute bend 110, each spring has a vertically-directed portion 112, and each of those vertically-directed portions is a tightly-closed re-entrant bend. The re-entrant bends 108 readily accommodate fasteners 114 which extend downwardly through two of the openings in the top plate 84 and through two of the openings 82 in the thin plate 76 and seat in two of the threaded openings 53 in the recessed block 52. The fasteners 114 hold the left-hand ends of the springs 106 fixed relative to the top plate 84. The lower ends of the vertically-directed portions 112 of the springs 106 extend downwardly through the openings 90 in the top plate 84 and through the notches 80 in the thin plate 76 to rest in the recesses 69 in the slide 58. The vertically-directed portions 112 of the springs 106 normally abut the adjacent ends of the openings 90 in the top plate 84, but those vertically-directed portions can be spread further apart and forced to move toward the opposite ends of the openings 90. Fasteners 116 extend downwardly through two openings at the right-hand end of the top plate 84 and extend downwardly through two of the openings 82 in the plate 76 to seat in the two threaded openings 53 at the right-hand end of the recessed block 52.

The numeral 118 denotes an electric motor that is suitably secured to an upward extension of the plate 55. That motor has a horizontally-directed output shaft 120, and that shaft supports a multi-lobe cam 122. The lobes of the cam 122 can successively engage the stem of the T-shaped bracket 68 on the slide 58, and can move that slide from the solid line position to the dotted line position in FIG. 2. As the cam 122 rotates in the counter clockwise direction, the lobes thereof will drive the slide 58 to the right and will then pass upwardly beyond and out of engagement with the stem of the T-shaped bracket 68, thereby permitting the helical extension springs 74 to move that slide back to the left.

In its normal position, the slide 58 will have its reduced thickness portion 62 disposed to the left of the opening 86, as shown by FIG. 2. This means that the lowermost coin in the opening 86 will rest upon the full-thickness portion of the slide 58 which is disposed to the right of the arcuate shoulder 64. As the multi-lobe cam 122 rotates in the counter clockwise direction, one of its lobes will move the slide 58 from the solid line position to the dotted line position in FIG. 2, and it will thereby cause the arcuate shoulder 64 to move to the right of the right-hand edge of the opening 86 in the top plate 84, as shown by FIG. 7. At such time, the lowermost coin 123 in the opening 86 will respond to gravity and will move downwardly onto the reduced thickness portion 62 of the slide 58. That coin will have its left-hand edge supported by the ramp-like projection 67 on the slide 58, and the ends of that projection will provide two points of support for that coin; and that coin will have its right-hand edge abutting the concave shoulder 64, and the reduced thickness portion 62 at the base of the shoulder 64 will provide a third point of support for that coin. This arrangement is desirable because it makes certain that the coin will receive three-point support and will thus be kept from tilting or rocking. This arrangement is particularly desirable where the coin is bent or deformed.

As the cam 122 continues to rotate in the counter clockwise direction, the said one lobe will pass upwardly beyond the upper edge of the stem of the T-shaped bracket 68 and will thereby permit the helical extension springs 74 to pull that slide to the left. As that slide moves to the left, the concave shoulder 64 will force the lowermost coin 123 in the opening 86 to move to the left. The leading edge 98 of the stop 96 will be in the path of that coin, and that leading edge will resist the movement of that coin to the left. However, the springs 74 are materially stronger than the spring 102; and, consequently, the springs 74 will force the slide 58 to move to the left and will force the stop 96 to move upwardly within the inclined opening 92 until the bottom face of that stop clears the top of the coin 123. If the second lowermost coin within the opening 86 attempts to move to the left with the coin 123, the lower edge of the opening 86 will not obstruct the movement of that coin, because the plate 76 spaces the bottom of that opening above the level of the upper surface of the ramp-like projection 67 a distance greater than the thickness of two superimposed coins. Such spacing is important because it makes certain that a bent or deformed coin can not become jammed in position as it is being moved to the left from the opening 86; and such spacing is made possible because the stop 96, rather than the outlet end of the opening 86, is relied upon to keep the second lowermost coin from moving with the lowermost coin 123. The second lowermost coin may tend to move to the left with the coin 123, because of frictional forces or because it has syrup or some other sticky material on it, but that second lowermost coin will be positively blocked by the stop 96; because that stop moved up just far enough to clear the lowermost coin and will thus be squarely in the path of the second lowermost coin. As a result, that second lowermost coin will be wholly unable to start moving out of the opening 86.

As the springs 74 move the slide 58 to the left, that slide will move the lowermost coin 123 from its position in register with the opening 86 to a position in register with the opening 56 in the recessed block 52. As that coin leaves its position in register with the opening 86, its leading edge will engage the vertically-directed portions 112 of the springs 106; and as that coin continues to move to the left, that coin will force those vertically-directed portions apart. The elongated nature of the openings 90 and the widths of the recesses 69 permit this movement of those vertically-directed portions. Also, as the coin 123 moves to the left, the bottom face of the stop 96 will ride along the top of that coin and it will positively block any tendency of the second lowermost coin to move with the lowermost coin 123.

As that lowermost coin approaches a position in register with the opening 56 in the recessed block 52, that coin will pass beyond the vertically-directed portions 112 of the springs 106 and thereby permit those portions to move back toward each other. As that coin reaches a position in register with the opening 56 in the recessed block 52, that coin will not be able to fall downwardly to and through that opening because the reduced thickness portion 62 of the that slide will be underlying and supporting that coin. Not until the slide 58 is again moved to the right will the coin 123 be free to fall downwardly to the opening 56 in the recessed block 52.

The slide 58 will be moved to the right when the next-succeeding lobe of cam 122 is moved against the T-shaped bracket 68; and at such time the coin 123 may tend to move back with that slide. However, that coin will not be able to go back with that slide because that coin will be unable to pass between the vertically-directed portions 112 of the springs 106. As a result, the coin 123 will be held against returning movement whereas the slide 58 will be forced to move to the right; and that slide will then move its opening 66 into register with the coin 123 and with the opening 56 of the recessed block 52. Thereupon, that coin will fall downwardly through the openings 66, 56 and 51 and be dispensed. When the slide 58 again moves back into engagement with the resilient bar 70, it will transport the then lowermost coin under the stop 96 and between the vertically-directed portions 112 of the springs 106. That coin will be available for prompt dispensing upon the next reciprocation of the slide 58.

As indicated by FIGS. 2 and 7, the leading edge 98 of the stop 96 is immediately adjacent the periphery of the opening 86. This is important because it makes sure that the second lowermost coin can not get out of that opening. Further, as indicated by FIG. 7, the inclined leading face 98 of the stop 96 has its upper edge disposed above the level of the top of the coin 123. This is important because it makes certain that the leading edge of the coin 123 will engage an inclined surface and thus be aided in raising the stop 96. It will also be noted that the angle between the inclined face 98 and the horizontal is approximately seventy degrees. A materially greater angle would unduly increase the force which the lowermost coin 123 would have to apply to that inclined face to effect raising of the stop 96, and a materially smaller angle could enable an occasional second lowermost coin to effect the raising of that stop. With the structure shown by FIGS. 1–10, however, the second lowermost coin can never raise the stop 96; and hence only the lowermost coin 123 can be moved out of the opening 86, and that coin will then be positively stripped off of the slide 58 by the springs 106.

Referring to FIGS. 11–23, the numeral 130 denotes the frame of a second preferred embodiment of coin-dispensing device that is made in accordance with the principles and teachings of the present invention. That frame is vertically directed, it has a flat central portion, and it has two flat forwardly-extending flanges at the sides thereof. A number of plates are grouped together, as shown by FIG. 12, to provide three vertically-directed coin passageways; and the front plate 132 is shown in FIG. 11 while the back plate 133 is shown in FIG. 13. In the particular embodiment shown, the forwardmost coin passageway accommodates nickels, the rearmost coin passageway accommodates quarters, and the intermediate coin passageway accommodates dimes. The coin passageways provided by the grouped plates are located immediately adjacent the right-hand side of the frame 130, as that frame is viewed in FIG. 11. The plate 132 has an arcuate slot 134 therein to accommodate the actuator 292 of a switch 290.

An accepted coin chute 136 underlies the right-hand side of each of the coin passageways defined by the grouped plates, and that coin chute extends downwardly and rearwardly from those passageways. A coin storage tube 138 underlies the left-hand portion of the intermediate coin passageway, and that coin tube will receive and hold dimes which issue from that coin passageway. A coin storage tube 140 underlies the left-hand portion of the forwardmost coin passageway, and that coin tube will receive and hold nickels that issue from that coin passageway.

Quarters will move downwardly throguh the rearmost coin passageway and enter the accepted coin chute 136, and that coin chute will direct those quarters toward a cash box. Dimes will move downwardly through the intermediate passageway and try to enter the coin storage tube 138, thereby tending to replenish the supply of dimes in that tube. In the event the coin tube 138 is full, the dimes will then pass to the accepted coin chute 136. Nickels will move downwardly through the forwardmost coin passageway and will try to enter the coin tube 140, thereby tending to replenish the supply of nickels in that tube. In the event that tube is full, the nickels will then pass to the accepted coin chute 136.

A funnel-like coin entrance 142 is provided at the top of the coin storage tube 138; and a generally similar, but larger, funnel-like coin entrance 144 is provided at the top of the coin storage tube 140. Those entrances facilitate the manual insertion of dimes and nickels into the coin storage tubes 138 and 140, respectively. Such insertion is necessary whenever the vending machine, with which the coin-dispensing device is associated, is first put into service or whenever the serviceman empties the coin storage tubes 138 and 140 to count the number of coins in those tubes.

The numeral 146 denotes the base for the coin-dispensing device shown in FIGS. 11–23. That base fits neatly within the frame 130, and that base is preferably made as a die casting. The base 146 has a vertically-directed opening 148 through it, and that opening accommodates the lower end of the coin storage tube 138. A shoulder 150 extends inwardly adjacent the bottom of the opening 148, and the lower end of the tube 138 rests upon that shoulder. A locating boss 152 is provided adjacent one side of the opening 148, and a second locating boss 154 is provided adjacent the opposite side of that opening. Those bosses facilitate rapid and easy insertion of the lower end of the coin storage tube 138 in the opening 148. A vertically-directed opening 156 is provided in the base 146 to accommodate the lower end of the coin storage tube 140. A shoulder 158 extends inwardly adjacent the bottom edge of the opening 156, and the lower end of the coin storage tube 140 rests upon that shoulder. A locating boss 160 is disposed adjacent one side of the opening 156, and that locating boss coacts with the locating boss 154 to facilitate rapid and easy insertion of the lower end of the coin storage tube 140 in the opening 156.

The numeral 162 denotes an upwardly-extending boss which is located adjacent the right-hand end of the front edge of the base 146. That boss is generally U-shaped in cross section so it can accommodate a horizontally-directed pivot 164. An upwardly-extending boss 166 is provided on the base 146 at a point to the left of the boss 162. The boss 166 acts as a stop for the left-hand end of the pivot 164 during the assembling of that pivot with the boss 162. An upwardly extending boss 168 is provided on the base 146 adjacent the right-hand end of the rear edge of that base; and that boss is adjacent the lower end of the accepted coin chute 136. The boss 168 has an opening, not shown, therein which accommodates the threaded shank of a screw that is passed through the left-hand wall of the accepted coin chute 136. That fastener fixedly secures the lower end of the accepted coin chute 136 to the boss 168 and thus to the base 146.

The numeral 172 denotes a boss which extends upwardly from the base 146, and that boss is disposed to the left of the boss 168. A boss 170, which is similar to the boss 172, is disposed to the left of the boss 172. A broader and taller boss 173 extends upwardly from the base 146, and that boss is disposed forwardly of the bosses 170 and 172. The boss 173 has a horizontally-directed, U-shaped groove in the top thereof; and the axis of that groove is parallel to a line defined by the bosses 170 and 172.

The numeral 176 denotes a notch in the front edge of the base 146; and that notch is disposed intermediate the opening 156 and the left-hand edge of the base 146. A pivot 178 is fixedly secured to the base 146, adjacent the boss 166, and that pivot is preferably a pin which has a horizontally-directed flange 179 adjacent the lower end thereof. The lower end of that pin extends downwardly through an opening in the base 146 and is then riveted over to fixedly secure that pin to that base.

The numeral 180 denotes a slot which is formed in the base 146 and which is contiguous with the opening 148. That slot extends rearwardly from the opening 148, when the base is viewed from the top, as in FIG. 14; and, of course, that slot extends forwardly from that opening when the base is viewed as in FIG. 18. A ridge 182 is provided on the underside of the base 146 adjacent the opening 148; and that ridge defines a shallow arcuate recess which is slightly wider than the diameter of a dime and which extends rearwardly from the opening 148. A ridge 184 is provided on the underside of the base 146 adjacent the opening 156, and that ridge defines a shallow arcuate recess which is slightly wider than the diameter of a nickel and which extends rearwardly from the opening 156. A boss 186 extends downwardly from the underside of the base 146, and that boss is adjacent the left-hand end of the front edge of that base. That boss is hollow, and it has an internal thread which can receive the shank of a fastener.

The numeral 188 generally denotes a coin-ejecting plate, and that plate is shown particularly by FIG. 15. That plate has an opening 190 adjacent the left-hand end thereof which accommodates a sleeve-like bushing 192. The inner diameter of that bushing is large enough to enable that bushing to telescope over the boss 186 on the underside of the base 146. The plate 188 also has an opening 194 therein and that opening is elongated in a direction which is parallel to the longitudinal axis of the plate 188. A notch 196 is disposed to the right of the opening 194, and that notch is disposed to the right of the notch 176 in the base 146. An opening 198 is provided in the plate 188, to the right of the notch 196, and that opening is opening is selectively disposable in register with the opening 156 in the base 146.

A downwardly-offset, coin-supporting area 200 is provided on the plate 188, to the right of the opening 198; and that area is conveniently formed by a punching operation. The sides 201 of the area 200 are arcuate in plan, and they are not truly vertical in elevation. The numeral 202 denotes arcuate openings which are formed in the plate 188 adjacent one end of the coin-receiving area 200, and those openings are vertically-directed. Those openings are important because they facilitate the provision of precisely vertical surfaces 204 that constitute a coin-driving shoulder for the plate 188, and also because they keep dirt from building up adjacent the shoulder 204 to the point where that dirt could cause dimes to ride up and over that shoulder. The plate 188 also has a narrow, downwardly-offset area 206 which is contiguous to the downwardly-offset coin-receiving area 200. The narrow area 206 is arcuate and extends forwardly from the said one end of the coin-receiving area 200. The numeral 208 denotes an ear which extends upwardly from the plane of the plate 188, and that ear is adjacent the right-hand end of that plate. A bar 210, of a resilient material such as rubber, is fixedly secured to the underside of the base 146 by fasteners 212. That bar is in register with the ear 208 on the plate 188, and that bar constitutes a cushioning stop for the plate 188.

The numeral 214 generally denotes the bottom plate for the coin-dispensing device of FIGS. 11–23. That plate has an opening 215 therein which can be set in register with the opening 190 of the plate 188 and in register with the boss 186 on the underside of the base 146. That plate has an arcuate slot 216 therein which is spaced to the right of the opening 215 and which is in register with the notch 176 of the base 146 and with the opening 194 of the coin-ejecting plate 188. The bottom plate 214 has a downwardly-offset area 220 which is arcuate in configuration and which is adjacent the right-hand end of that plate. That downwardly-offset area is in register with, and is wide enough to accommodate, the downwardly-offset coin-supporting area 200 of the coin-ejecting plate 188. A number of upwardly-projecting, arcuate ridges 218 are provided on the plate 214, and those ridges are concentric with the opening 215.

The bottom plate 214 underlies and helps support the coin-ejecting plate 188 while permitting ready movement of that plate. The ridges 218 which extend upwardly from the plane of the plate 214 engage the bottom face of the coin-ejecting plate 188 and minimize the frictional forces between that coin-ejecting plate and that bottom plate. Fasteners 222 extend upwardly through openings in the bottom plate 214 and seat in threaded openings in the base 146 to maintain that bottom plate and coin-ejecting plate 188 in assembled relation with the base 146. One of the fasteners 222 extends through the opening 215, through the bushing 192 and into the threaded boss 186. That fastener and the bushing 192 serve as the pivot for the coin-ejecting plate 188.

The numeral 224 denotes an elongated, generally L-shaped arm which has an elongated hub 226 at the right-hand end thereof. That hub telescopes downwardly over the pin 178; and a C-washer 228 fits into a groove adjacent the top of that pin to prevent accidental separation of the arm 224 from that pin. A pin 230 is carried by the left-hand end of the arm 224, and that pin projects upwardly and downwardly from the upper and lower faces, respectively, of that arm. The upwardly-projecting portion of the pin 230 rotatably supports a roller 232; and a C-washer 234 is seated in a groove adjacent the top of the upwardly-projecting portion of the pin 230 to prevent accidental separation of that roller from that pin. The downwardly-projecting portion of the pin 230 extends through the opening 194 in the coin-ejecting plate 188 and lodges in the slot 216 of the bottom plate 214.

A helical extension spring 236 has the front end thereof secured to the arm 224 and has the rear end thereof secured to the housing 238 of a motor 239. That motor housing overlies the left-hand rear portion of the base 146. The spring 236 biases the arm 224 for clockwise rotation about the pin 178, but it can yield to permit rotation of that arm in the counter clockwise direction.

The motor 239 has a geared-down output shaft 242, and that shaft projects forwardly from the motor housing 238. The numeral 244 generally denotes a cam which is mounted on the output shaft 242. That cam is circular in elevation, and it has a low dwell 246, a long rise 248, a short dwell 250, a short rise 251, a second short dwell 252, a short rise 253, a high dwell 254, and an abrupt fall 256. The various dwells and rises of the cam 244 will be engaged by the roller 232 on the arm 224 and will determine the position of that arm. The cam 244 has a hub 258 at the front thereof that receives a set screw which fixedly secures the cam to the output shaft 242. The cam 244 also has a camming surface 260 at the rear thereof.

The numeral 262 denotes a pin that is secured to the motor housing 238 and that projects forwardly from that housing. That pin is in general vertical alinement with the output shaft 242 of the motor 239 but it is spaced above the level of that shaft. A lever is generally denoted by the numeral 264, and that lever has a hub 266 which telescopes over the pin 262. A C-washer 268 seats within a groove adjacent the front of the pin 262 to prevent accidental separation of the lever 264 from that pin. The lever 264 has an offset 270 therein which disposes the lower portion of that lever rearwardly of the plane of the upper portion of that lever, as shown by FIG. 12. The rearwardly-offset lower portion of the lever 264 carries a pin that rotatably supports a roller 272. That roller is in register with, and will be moved by, the camming surface 260 at the rear of the cam 244. A helical extension spring 273 has one end thereof hooked in an opening in the motor housing 238 and has the other end thereof hooked in an opening in an ear 275 on the lever 264; and that spring will bias the lever 264 for counter clockwise rotation. As a result, that spring will hold the roller 272 in engagement with the camming surface 260 at the rear of the cam 244.

An offset 274 is provided on the lever 264 adjacent the top of that lever, and that offset extends rearwardly from the plane of the upper portion of that lever. That offset extends to the left from the upper end of the lever 264. An offset 276 is provided on the lever 264 adjacent the top of that lever, and that offset extends rearwardly from the plane of the upper portion of that lever. That offset extends to the right from the upper end of the lever 264. An arm 278 extends to the right from the upper portion of the lever 264, and that arm carries a rearwardly-extending pin 280. The outer end of the arm 278 underlies the back plate 133 of the grouped coin passageways.

The numeral 282 denotes a double throw switch which is suitably mounted above the top of the motor housing 238. That switch has a horizontally-directed resilient actuator 284; and a roller which is carried by the right-hand end of that actuator is in register with the offset 274 on the lever 264. The numeral 286 denotes a double throw switch which is disposed immediately below the switch 282; and that switch has a horizontally-directed resilient actuator 288. That actuator carries a roller at the right-hand end thereof, and that roller is in register with the offset 276 on the lever 264. The actuators 284 and 288 of the switches 282 and 286, respectively, are biased for movement forwardly from those switches. However, the forward movement of those actuators is limited by stops 285 and 287 that overlie those actuators.

The numeral 290 denotes a double throw switch which is supported on bosses 291 that project rearwardly from the rear wall 133 of the grouped coin passageways. That switch is disposed above the level of the switch 282 and it is disposed to the right of that switch, as the coin-dispensing device is viewed from the front. The switch 290 has a switch arm 292 that extends to the left in FIG. 13, and that switch arm has a forwardly-directed portion which extends into an arcuate slot 294 in the rear wall 133. That forwardly-directed portion extends through the quarter passageway, through the dime passageway and through the nickel passageway and then lodges in the slot 134 in the front wall 132.

The numeral 295 denotes bosses which extend rearwardly from the rear wall 133, and those bosses support a switch 296. The switch 296 is disposed a short distance below the switch 290, and it has a double throw switch actuator 298 that has a sharp, re-entrant bend 299 therein. The free end of the switch actuator 298 has a portion which is bent to extend forwardly through the arcuate slot 300 in the rear wall 133 and to extend into the quarter passageway.

A pin 302 extends rearwardly from the rear wall 133; and a bracket 304 has an opening which snugly telescopes over the pin 302. That bracket has a second opening that holds a short cylindrical permanent magnet 306. That magnet is in register with the actuator 298 of the switch 296, and the magnetic field of that magnet can hold the actuator 298 in the lower position shown by FIG. 13 whenever a quarter has engaged the actuator 298 and has moved it downwardly through the slot 300.

The pin 280 on the arm 278 of lever 264 is adjacent the re-entrant bend 299 of the switch actuator 298 whenever that switch actuator is in its lower position. That pin can respond to clockwise rotation of the lever 264, in FIG. 11, to move to the left and thereby force the actuator 298 to move upwardly and away from the magnet 306. Such movement will reduce the pull which the magnetic field of the magnet 306 has for the actuator 298 and will enable the returning spring within the switch 296 to move the actuator 298 up to the upper end of the slot 300.

The numeral 308 denotes a pin which is secured to the motor housing 238 and which extends forwardly from that housing. That pin is disposed intermediate the levels of pin 262 and output shaft 242, but it is disposed to the right of a vertical line connecting that pin and shaft. An L-shaped lever 310 has the foot thereof equipped with an opening that telescopes over the pivot 308. A C-washer 312 seats in a groove at the forward end of the pin 308 and thereby prevents accidental separation of the L-shaped lever 310 from the pin 308. An ear 314 is provided on the lever 310, and that ear extends rearwardly beyond the foot of that lever. That ear extends into an arcuate slot 316 in the front face of the motor housing 238. The normal position and the shifted position of the lever 310 are shown in FIG. 11 by solid lines and by dotted lines, respectively. In the normal position of the lever 310, the ear 314 is spaced wholly away from the lever 264 and thus can not interfere with the movement of that lever. As lever 310 is moved to shifted position, the ear 314 thereon will engage the right-hand edge of the lever 264, at a point below the level of the pivot 262, and will rotate that lever in the clockwise direction. Subsequently, that ear will hold the lever 264 in rotated position.

The numeral 318 denotes a pivot that can be disposed within the groove in the top of the boss 173 that projects upwardly from the base 146 adjacent the openings 148 and 156 in that base. That pivot will lie horizontally in that groove, and it will project outwardly beyond both ends of that groove. A generally W-shaped spring 320 will overlie the top of that pivot; and the arms of that spring will coact with the groove in the boss 173 to confine that pivot while permitting slight vertical movement of either end of that pivot relative to the boss 173. A fastener 322 telescopes through an opening defined by the spring 320 and seats in a threaded opening in the stud 173; and that fastener will prevent accidental separation of that spring from that boss. Two ears 324 project upwardly from the upper face of the boss 173, and those ears will hold the arms of the spring 320 in position where they overlie the pivot 318.

The numeral 326 generally denotes a feeler that can be used to feel for dimes within the coin storage tube 138. A second feeler 326 is used to feel for nickels in the coin storage tube 140. Each of the feelers 326 has a hub 327 thereon, and those hubs telescope over the ends of the pivot 318. Each of the feelers 326 has a counterweight 328, and each of those feelers has a switch-engaging extension 330. The upper ends of those switch-engaging extensions are offset toward each other, as shown particularly by FIG. 23. As a result, the upper ends of the switch-engaging extensions 330 are closer together than are the other portions of the feelers 326. The feelers 326 have convex coin-engaging faces, and those faces extend inwardly into the coin tubes 138 and 140 through slots 139 adjacent the bottoms of those tubes.

A switch 334 is mounted on a flange 333 that extends rearwardly from the rear wall 133; and that switch constitutes the empty switch for the coin-dispensing device of FIGS. 11–23. That switch has an actuator 336 which extends downwardly from the pivot of that switch, and that actuator has a horizontally-directed portion, shown by FIG. 13, that spans the distance between the offset upper ends of the switch-engaging portions 300 of the feelers 326. Either of the feelers 326 can engage and move the horizontally-directed lower portion of the switch actuator 336; and hence if the supply of dimes or the supply of nickels gets too low, the empty switch 334 will be actuated.

The numeral 340 generally denotes a generally J-shaped lever; and that lever has two ears 342 which extend downwardly from one end of that lever. Each of those ears has an opening therein, and those openings are alined and accommodate the ends of the pivot 164. A screw 345 is seated in an opening at the top of the boss 162 and will overlie and hold the pivot 164. In doing so, that screw will fixedly hold that pivot in assembled relation with the boss 162 and will prevent accidental separation of the lever 340 from the base 146.

The free end of the lever 340 is denoted by the numeral 344 and it is vertically-directed; and that free end is in register with, and it has its lower end extending downwardly into, the slot 180 in the base 146. The bottom face of the free end 344 will normally rest upon, and be supported by, the downwardly-offset, coin-receiving area 200 of the coin-ejecting plate 188.

The free end of lever 340 has a stop 346 thereon, and that stop can abut the upper face of the base 146 to limit downward movement of lever 340. The free end of lever 340 is dimensioned so the stop 346 will be above, but immediately adjacent, the upper face of the base 146 when the bottom face of that free end is resting upon the downwardly-offset, coin-receiving area 200 on the coin-ejecting plate 188. The free end of the lever 340 has an inclined face 348 that extends upwardly from the bottom of the free end and that coacts with the area 200 to subtend an angle of substantially seventy degrees. The free end 344 has an edge 350 that inclines upwardly and to the left from the upper end of the inclined face 348. The height of the inclined face 348 is greater than the thickness of a freshly minted dime but is less than the combined thickness of two superimposed dimes.

The free end 344 also has a vertically-directed face 352 thereon, and that face extends upwardly from the bottom of that free end. That vertically-directed face can be considered as the trailing face of that free end whereas the inclined face 348 can be considered as the leading face of that free end. An opening 354 is provided in the free end 344, and that opening accommodates one end of a spring 356. The other end of that spring is secured to the base 146 by a fastener 358, as shown by FIG. 14. That spring biases the lever 340 to the position shown by FIG. 19, but it can yield to permit that lever to rotate to the position shown by FIG. 20.

When the various components of the coin-dispensing device of FIGS. 11–23 are in their normal positions, the cam 244 will have its high dwell 254 in engagement with the roller 232 on the arm 224. This means that the lower end of the pin 230 will coact with the opening 194 in the plate 188 to hold the opening 198 generally in register with the opening 156 and to hold the downwardly-offset, coin-receiving area 200 generally in register with the opening 148. A nickel will be lodged within the opening 198 and will be resting upon two of the ridges 218 of the bottom plate 214; and a dime 338 will be in register with the opening 148 and will be resting upon the downwardly-offset, coin-receiving area 200 of the coin-ejecting plate 188. The free end 344 of the lever 340 will have its bottom face resting upon the downwardly-offset, coin-receiving area 200. The inclined face 348 of that free end will be projecting into the tube 138 through the slot 180 and will obstruct the path of movement of the dime 338 and of a dime that rests atop that dime.

The feelers 326 will be in the dotted-line position shown by FIG. 22 and will thus hold the empty switch 334 open. The switch actuator 292 will be adjacent the upper ends of the slots 134 and 294, and the lever 264 will hold the offsets 274 and 276 out of engagement with the rollers carried by the actuators 284 and 288.

If a dime is inserted, that dime will engage the switch actuator 292, will move that switch actuator down, and will then release that switch actuator and pass to the coin storage tube 138. In moving the switch actuator 292 downwardly and in then releasing that switch actuator, the dime will enable the switch 290 to send an impulse to the vending machine with which the coin-dispensing device is used. In passing to the coin storage tube 138, the dime will try to replenish the supply of dimes in that coin tube; but if that tube is full, that dime will pass to the accepted coin chute 136 and thus be directed to the cash box, not shown.

If a nickel is inserted, that nickel will be directed away from the switch actuator 292 by a flipper in the slug rejector, not shown. That nickel will try to enter the coin tube 140, and thereby replenish the supply of nickels; but if the coin tube 140 is full, that nickel will pass to the accepted coin chute 136 and then pass to the cash box. When a second nickel is inserted, that second nickel will engage and move the switch actuator 292. In moving the switch wire 292, the second nickel will cause the switch 290 to send an impulse to the vending machine. That second nickel will try to enter the coin tube 140 and thereby replenish the supply of nickels, but if that tube is full that second nickel will pass to the accepted coin chute 136 and be directed to the cash box. It will be noted that whenever dimes and nickels are inserted, the switch 296 is not actuated.

When a quarter is inserted, that quarter will successively engage the switch actuators 292 and 298 and then pass into the accepted coin chute 136. As the quarter moves the switch actuator 292 down, it will cause the switch 290 to send an impulse to the vending machine; and as the quarter moves the switch actuator 298 down, it will cause the switch 296 to energize the motor 239. As the switch actuator 298 is moved down close to the bottom of the slot 300, the magnet 306 will attract and hold that switch actuator. As a result, the switch 296 will be able to keep the motor 239 energized even though the quarter passes beyond the switch actuator 298 and passes to the cash box.

The motor 239 will be energized by means of a circuit which includes the normally-open contacts of switch 296 and the normally-closed contacts of switch 286; and that motor will cause the output shaft 242 to start rotating the cam 244 in the counter clockwise direction. Almost immediately, the high dwell 254 will pass out from under the roller 232; and thereupon the spring 236 will rotate the lever 224 in the clockwise direction, and such rotation will cause the pin 230 to rotate the coin-ejecting plate 188 in the counter clockwise direction. This latter rotation will cause the opening 198 to move the nickel, lodged therein, beyond the rear edge of the bottom plate 214; and that nickel will then fall to a chute that will conduct it to a coin receptacle at the exterior of the vending machine. The counter clockwise rotation of the coin-ejecting plate 188 will also cause the shoulder 204 to engage the dime 338 which had been resting on the downwardly-offset, coin-receiving area 200 and to force the leading edge of that dime against the inclined face 348 on the free end 344 of the lever 340. The forces applied to the coin-ejecting plate 188 by the spring 236 will be great enough to enable the dime 338 to force the lever 340 to rotate upwardly about the pivot 164; and hence the lower face of the free end 344 of that lever will rise upwardly and let the dime 338 pass beneath it. That lower face will not move up any higher than the coin 338 will make it move; and, consequently, the leading edge 348 of the free end 344 of lever 340 will be in position to block any tendency of the second lowermost dime to move with the dime 338. This is important because it is imperative that just one dime be paid out.

Further counter clockwise rotation of the coin-ejecting plate 188 will move the dime 338 along under the bottom face of the free end 344; and that bottom face will respond to the spring 356 to maintain a downward pressure on the dime 338. As the coin-ejecting plate 188 approaches the end of its counter clockwise stroke, the shoulder 204 will force the trailing edge of the dime 338 to move beyond the vertical face 352 on the free end 344 of the lever 340. Thereupon, the spring 356 will force the bottom face of the free end 344 of the lever 340 downwardly against the downwardly-offset narrow area 206 of the plate 188. At such time, the vertical face 352 on the free end 344 will be interposed between the trailing edge of the dime 338 and the coin storage tube 138. Also, at such time, the dime will be disposed beyond the rear edge of the bottom plate 214. However, that dime will not be able to fall downwardly to the chute that will conduct it to the coin receptacle at the exterior of the vending machine, because that dime will be underlain by the downwardly-offset, coin-receiving area 200 on the plate 188.

The fall 256 is quite abrupt, and hence the counter clockwise rotation of the plate 188 will be rapid. The resilient bar 210 will intercept the ear 208 on that plate and thereby cushion the stopping of that plate as it reaches the end of its counter clockwise stroke. The lever 224 and the plate 188 will remain in their rotated positions as the low dwell 246 passes beneath the roller 232; but that lever and that plate will start to return to their normal positions as the long rise 248 engages the roller 232. As the plate 188 starts moving back to its normal position, the dime 338 will tend to move with that plate. However, the vertical face 352 on the free end 344 will positively block any such returning tendency. The result is that the dime 338 will remain stationary as the plate 188 moves out from under it, and that dime will then drop downwardly and pass to the chute which will conduct it to the exterior of the vending machine. As the plate 188 moves out from under the dime 338, that dime will be confined against undesired lateral movement by the ridge 182 which is provided at the underside of the base 146.

The long rise 248 on the cam 244 will not move the lever 224 far enough in the counter clockwise direction to move the plate 188 far enough to cause the dime 338 to be stripped from its position atop the downwardly-offset, coin-receiving area 200. Such stripping will occur only after the cam 244 has rotated far enough in the counter clockwise direction to place the short rise 251 in engagement with the roller 332.

During the engagement of the roller 232 with the fall 256, the dwell 246, rise 248, and the dwell 250, the camming surface 260 will have left the position of the lever 264 undisturbed; but as the rise 251 acts upon the roller 232, the camming surface 260 will act upon the roller 272 carried by the offset lower portion of the lever 264. That camming surface will cause the lever 264 to rotate in the clockwise direction; and such rotation will cause the offset 274 to engage the roller carried by the actuator 284 of switch 282 and thereby shift the movable contact of that switch into engagement with the normally-open contact of that switch. Such shifting will not interrupt the energization of the motor 239, because the normally-open contacts of switch 296 and the normally-closed contacts of switch 286 will continue to supply current to that motor. Either simultaneously with, or shortly after, the engagement between offset 274 and the roller on actuator 284, the pin 280 on extension 278 will move against the re-entrant bend 299 of switch actuator 298, thereby forcing that actuator upwardly and away from the magnet 306. That switch actuator will then move up to the upper end of the slot 300; and, as it does so, it will move the movable contact of switch 296 into engagement with the normally-closed contact of that switch. In doing so that actuator will cause the current for the motor 239 to pass through the normally-closed contacts of switch 296, through the normally-open contacts of the switch 282, and then through the normally-closed contacts of the switch 286. At this time the short dwell 252 will be in engagement with the roller 232 on the pin 230 carried by the lever 224.

As the cam 244 continues to rotate, the camming surface 260 will release the roller 272 on the lever 264; and the spring 273 will promptly rotate the lever 264 in the counter clockwise direction. That lever will rotate far enough in that direction to move the offset 274 out of engagement with the roller on the resilient actuator 284 and to move the offset 276 into engagement with the roller on the resilient actuator 288. The movable contact of the switch 282 will thus be moved back into engagement with its normally-closed contact and the movable contact of the switch 286 will thus be moved into engagement with its normally-open contact; and the current for the motor will then flow through the normally-closed contacts of switch 296, through the normally-closed contacts of the switch 282, and through the normally-open contacts of the switch 286.

By this time, the cam 244 will have moved the short rise 253 out from under the roller 232, and that roller will bear against the high dwell 254. The cam 244 will then rotate a few degrees further and cause the camming surface 260 thereof to return the lever 264 to its normal position. Thereupon, the movable contact of the switch 286 will return to its normal position and break the circuit to the motor 239. The cam 244 will then come to rest, and that cam will remain at rest until a further quarter is inserted.

The shifting of the movable contact of the switch 282 coacts with the freeing of the switch actuator 298 and with the subsequent shifting of the movable contact of the switch 286 to de-energize the motor 239 in the event the movable contact of either of the switches 296 or 286 sticks. Such de-energization is desirable because it would keep the motor 239 from operating beyond the end of a normal cycle and would thus keep the plate 188 from dispensing more than the specified number of coins. However, if the switches 296 and 286 do not stick, the motor 239 will operate uninterruptedly for one full cycle and then come to rest.

It will be noted that during the forward stroke of the plate 188, a nickel was paid out; but the dime was not paid out, that dime being held atop the downwardly-offset, coin-receiving area of the plate 188 during that stroke. Only during the return stroke was the dime paid out; and that dime was paid out by being stripped off of that downwardly-offset, coin-receiving area by the trailing edge of the free end 344 of the lever 340. It will also be noted that the downwardly-offset narrow area 206 of the plate 188 made it possible for the bottom of the free end 344 to move down into position where it was squarely in the path of the dime 338 as that dime tended to move with the plate 188 during the return stroke of that plate. It will thus be apparent that the lever 340 performs the dual function of compensating for variations in the thicknesses of the dimes to be paid out and of stripping those dimes off of the plate 188.

It will also be noted that the outlet end of the tube 138 is spaced from the downwardly-offset, coin-receiving area 200 of the plate 188 a distance materially greater than the thickness of the dime 338. Such spacing is desirable because it makes certain that any coins which are bent will not be jammed within the coin tube 138 as they try to pass outwardly from that tube. The large opening or space defined by the bottom of the tube 138 and the downwardly-offset, coin-receiving area 200 of the plate 188 does not, however, permit more than one dime to be dispensed at a time, because the lever 340 positively prevents the dispensing of more than one dime per stroke.

The inclined edge 350 on the free end 344 of lever 340 extends from lower right to upper left, and that edge is important in avoiding any jamming of the dimes within the tube 138 by that free end. The lever 340 rotates around the pivot 164; and this means that the instantaneous movement of the edge 350 will be predominantly upward when the lever 340 rotates in the clockwise direction in FIG. 19. If the edge 350 was not inclined, but, instead, was perfectly vertical, the top edge of that surface would tend to abut dimes within the coin tube 138 and prevent their free and unobstructed movement downwardly through that tube in response to gravity.

As the cam 244 rotated the long rise 248 into engagement with the roller 232, that cam extended the spring 236; thereby storing energy in that spring. That energy urged the ear 232 against that rise and thereby biased the cam 244 for rotation in the opposite direction. Normally, the rotative forces of the motor 239 will exceed the bias applied by the spring 236; but if a person de-energizes the motor 239, as by removing the plug from the electric socket, the bias applied by the spring 236 could rotate the cam 244 in the reverse direction. Recurrent de-energizations and re-energizations of the motor 239 could thus cause the cam 244 to oscillate; and such oscillations would cause oscillations of the coin-ejecting plate 188. However such oscillations could not lead to the dispensing of nickels or dimes because further nickels could not get down into the opening 198, and further dimes could not get down onto the downwardly-offset, coin-receiving area 200.

If the cam 244 were recurrently caused to rotate an additional thirty degrees in the counter clockwise direction, and then caused to rotate about sixty degrees in the opposite direction, by the de-energization of the motor 239, nickels and dimes could be dispensed; because during that further thirty degrees rotation, the downwardly-offset, coin-receiving portion 200 and the opening 198 were moved close enough to the bottoms of the coin storage tubes 138 and 140 to accept dimes and nickels from those tubes. However, the present invention obviates recurrent rotation of the cam 244 through those additional thirty degrees by providing short dwells 250 and 252 and short rises 251 and 253 rather than one continuous rise. If the motor 239 were to be de-energized as the ear 232 rode up on the short rise 251, the spring 236 could rotate that cam a short distance in the opposite direction; but that rotation would stop when the ear 232 reached the short dwell 250. Similarly, if the motor 239 were to be de-energized as the ear 232 rode up on the short rise 253, the spring 236 could rotate that cam a short distance in the opposite direction; but that rotation would stop when the ear 232 reached the short dwell 252. Such short rotations could not lead to the dispensing of coins. The overall result is that it is impossible for a person, by de-energizing and then re-energizing the motor 239, to produce reciprocations of the plate 188 of sufficient amplitude to effect the paying out of coins.

As the lowermost nickels and dimes move relative to the second lowermost nickels and dimes, respectively, those nickels and dimes can, because their surfaces are not perfectly smooth, provide upward thrusts on the columns of coins held within the tubes 138 and 140. If those columns of coins were short enough so the coin-engaging faces 332 of the feelers 326 overlaid and engaged the uppermost coins, upward thrusts would be applied to those feelers. Such upward thrusts are accommodated and are compensated for by the W-shaped spring 320 and the limited upward movement of the pivot 318 which that spring permits. Consequently, destructive forces can not be applied to the feelers 326.

It is frequently desirable to empty the coin storage tubes 138 and 140 for the purpose of counting the number of coins in those tubes. This emptying is easily and effectively attained in the coin-dispensing device of the present invention by grasping the L-shaped lever 310 and rotating it in the counter clockwise direction. That rotation will cause the ear 314 to move against the lower right-hand face of the lever 264 and to rotate that lever in the clockwise direction. Such rotation will cause the offset 274 to move into engagement with the actuator 284 of the switch 282, thereby placing the movable contact of that switch in engagement with the normally-open contact of that switch. Such engagement will energize the motor 239 and will keep that motor energized until the lever 310 is rotated back to its solid line position in FIG. 11. The lever 310 can not respond to vibrations or to tilting to rotate into the dotted line position of FIG. 11, because that lever is eccentrically mounted and because gravity biases that lever against such rotation.

It will be noted that the arm 224 is subjected to laterally-directed forces by the spring 236 and is also subjected to laterally-directed forces by the cam 244. Those forces are consolidated and transferred to the plate 188 by the pin 230. As a result, the plate 188 will be largely free of laterally-directed forces that are applied to that plate at spaced points. It will also be noted that the pin 230 applies its forces to the plate 188 at a point closely adjacent the pivot for that plate. For these various reasons, the plate 188 will be largely free of warping and twisting forces.

In the coin-dispensing devices of FIGS. 1–10 and 11–23, respectively, the coin storage tubes extend upwardly from the slides. However, the present invention is equally usable where the coin tubes extend downwardly from the slides.

Whereas the drawing and accompanying description have shown and described two preferred embodiments of the present invention, it should be apparent to those skilled in the art that various changes may be made in the form of the invention without affecting the scope thereof.

What we claim is:

1. In a coin dispensing device, a stationary support, a tube that engages and that extends upwardly from said support, and opening in said support in register with the lower end of said tube, said opening and said tube constituting a coin reservoir which can hold a stack of coins in vertical array, an ejector movably mounted immediately adjacent said support and adjacent the outlet end of said coin reservoir, a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin to be held by said coin reservoir and to be moved relative to said coin reservoir by said ejector, a member that can cause said ejector to move relative to said coin reservoir, a coin-driving surface on said ejector that can engage a coin that is in register with said outlet end of said coin reservoir and that can respond to movement of said ejector in one direction relative to said coin reservoir to force said coin to move relative to said coin reservoir, said ejector being formed to define a recess therein rearwardly of said coin-driving surface, said outlet end of said coin reservoir being spaced from said coin-receiving surface on said ejector a distance great enough to permit two superimposed coins to pass between said outlet end and said coin-receiving surface, whereby a bent coin can freely pass between said outlet end of said coin reservoir and said coin-receiving surface, a stop means that is movable into and out of the path of movement of a coin passing between said outlet and of said coin reservoir and said coin-receiving surface, and a spring biasing said stop means into said path of movement of said coin and into said recess but being yieldable to permit said stop means to move out of said path of movement of said coin and to move into a position that is immediately adjacent said path of movement of said coin whereby said coin can move past said stop means but a second coin that is superimposed upon said coin can not move past said stop means, said stop means subsequently responding to said spring to move into said recess that is disposed rearwardly of said coin-driving surface and to thereby interpose itself between said coin and said coin reservoir to block movement of said coin back toward said coin reservoir as said ejector moves in the opposite direction back toward said coin reservoir, said stop means having an upper portion thereof forming part of the periphery of said coin reservoir and being immediately adjacent coins within said coin reservoir but not extending inwardly of the inner surface of said coin reservoir, whereby said stop means can permit unobstructed movement of coins downwardly in said coin reservoir, said stop means having a leading edge that has an angle of approximately seventy degrees, said stop means having a trailing edge that has an angle of approximately ninety degrees, said stop means being pivoted for rotation about that end thereof which is remote from said path of movement of said coin and being pivoted about an axis that is disposed above the level of and to one side of said leading edge of said stop means, whereby said leading edge of said stop means will move laterally with and vertically upwardly and away from a coin as said coin is moved against said stop means, said stop means keeping a second coin which is within said coin reservoir and which is abutting the first said coin from moving even a part thereof outwardly of the outer periphery of said coin reservoir.

2. In a coin dispensing device, a stationary support, a tube that engages and that extends upwardly from said support, an opening in said support in register with the lower end of said tube, said opening and said tube constituting a coin reservoir which can hold a stack of coins in vertical array, an ejector movably mounted immediately adjacent said support and adjacent the outlet end of said coin reservoir, a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin to be held by said coin reservoir and to be moved relative to said coin reservoir by said ejector, a member that can cause said ejector to move relative to said coin reservoir, a coin-driving surface on said ejector that can engage a coin that is in register with said outlet end of said coin reservoir and that can respond to movement of said ejector in one direction relative to said coin reservoir to force said coin to move relative to said coin reservoir, said outlet end of said coin reservoir being spaced from said coin-receiving surface a distance great enough to permit two superimposed coins to pass between said outlet end and said coin-receiving surface, whereby a bent coin can freely pass between said outlet end of said coin reservoir and said coin-receiving surface, a stop means that is movable into and out of the path of movement of a coin passing between said outlet end of said coin reservoir and said coin-receiving surface, and a spring biasing said stop means into said path of movement of said coin but being yieldable to permit said stop means to move out of said path of movement of said coin and to move into a position that is immediately adjacent said path of movement of said coin whereby said coin can move past said stop means but a second coin that is superimposed upon said coin can not move past said stop means, said stop means subsequently responding to said spring to interpose itself between said coin and said coin reservoir to block movement of said coin back toward said coin reservoir as said ejector moves in the opposite direction back toward said coin reservoir, said stop means having a trailing edge that has an angle of approximately ninety degrees, said stop means being pivoted for rotation about that end thereof which is remote from said path of movement of said coin and being pivoted about an axis that is disposed above the level of and to one side of said leading edge of said stop means, whereby said leading edge of said stop means will move laterally with and vertically upwardly and away from a coin as said coin is moved against said stop means, said stop means keeping a second coin which is within said coin reservoir and which is abutting the first said coin from moving even a part thereof outwardly of the outer periphery of said coin reservoir.

3. In a coin dispensing device, a stationary support, a tube that engages and that extends upwardly from said support, an opening in said support in register with the lower end of said tube, said opening and said tube constituting a coin reservoir which can hold a stack of coins in vertical array, an ejector movably mounted immediately adjacent said support and adjacent the outlet end of said coin reservoir, a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin to be held by said coin reservoir and to be moved relative to said coin reservoir by said ejector, a member that can cause said ejector to move relative to said coin reservoir, a coin-driving surface on said ejector that can engage a coin that is in register with said outlet end of said coin reservoir and that can respond to movement of said ejector in one direction relative to said coin reservoir to force said coin to move relative to said coin reservoir, said ejector being formed to define a recess therein rearwardly of said coin-driving surface, said outlet end of said coin reservoir being spaced from said coin-receiving surface a distance great enough to permit two superimposed coins to pass between said outlet end and said coin-receiving surface, whereby a bent coin can freely pass between said outlet end of said coin reservoir and said coin-receiving surface, a stop means that is movable into and out of the path of movement of a coin passing between said outlet and of said coin reservoir and said coin-receiving surface, and a spring biasing said stop means into said path of movement of said coin and into said recess but being yieldable to permit said stop means to move out of said path of movement of said coin and to move into a position that is immediately adjacent said path of movement of said coin whereby said coin can move past said stop means but a second coin that is superimposed upon said coin can not move past said stop means, said stop means subsequently responding to said spring to move into said recess that is disposed rearwardly of said coin-driving surface and to thereby interpose itself between said coin and said coin reservoir to block movement of said coin back toward said coin reservoir as said ejector moves in the opposite direction back toward said coin reservoir, said stop means keeping a second coin which is within said coin reservoir and which is abutting the first said coin from moving even a part thereof outwardly of the outer periphery of said coin reservoir.

4. In a coin-dispensing device, a stationary support, a tube that engages and that extends upwardly from said support, an opening in said support in register with the lower end of said tube, said opening and said tube constituting a coin reservoir which can hold a stack of coins in vertical array, an ejector movably mounted immediately adjacent said support and below and immediately adjacent the outlet end of said coin reservoir, and means to move said ejector relative to said outlet end of said coin reservoir, the improvement which comprises a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin which is to be held by said coin reservoir and which is to be moved relative to said coin reservoir by said ejector, a coin-driving surface on said ejector that is adjacent said coin-receiving surface and that can engage a coin resting on said coin-receiving surface in register with said outlet end of said coin reservoir and that can respond to movement of said ejector in one direction relative to said coin reservoir to force said coin to move relative to said coin reservoir, a stop means, and mounting means for said stop means which holds said stops means for movement into and out of the path of movement of a coin resting on said coin-receiving surface, said stop means being biased into, and normally being in, said path of movement of said coin but being movable out of said path of movement of said coin by said coin as said coin is moved by said coin-driving surface, said stop means, subsequently responding to the bias thereon to interpose itself between said coin and said coin reservoir to block movement of said coin back towards said coin reservoir as said ejector moves in the opposite direction toward said coin reservoir, said coin reservoir having a slot in the wall thereof, said stop means having a portion thereof extending into said slot in said reservoir to essentially form a part of said wall of said coin reservoir, said coin-receiving surface being spaced from said outlet end of said coin reservoir a distance substantially greater than the thickness of said coin to define an exit opening through which bent coins can easily be moved, whereby bent coins will not jam against said outlet end of said coin reservoir, said mounting means for said stop means permitting said stop means to move away from said coin-receiving surface a distance substantially greater than the thickness of said coin, whereby said stop means permits bent coins to pass beneath it rather than intercept and jam said bent coins, said stop means having an inclined leading edge so said coin, whether flat or bent, can engage said leading edge and move said stop means out of said path of movement of said coin, said stop means always remaining in the path of a second coin which is within said coin reservoir and which is abutting the first said coin and thereby keeping said second coin from moving even a part thereof outwardly of the outer periphery of said coin reservoir, said stop means not extending inwardly of the inner surface of said coin reservoir, whereby said stop means can permit unobstructed movement of coins downwardly in said coin reservoir, said stop means having a trailing edge that keeps a coin from engaging said stop means and moving said stop means out of the return path of said coin as said ejector is moved in said opposite direction toward said coin reservoir.

5. In a coin dispensing device, a stationary support, a tube that engages and that extends upwardly from said support, an opening in said support in register with the lower end of said tube, said opening and said tube constituting a coin reservoir which can hold a stack of coins in vertical array, an ejector movably mounted immediately adjacent said support and adjacent the outlet end of said coin reservoir, a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin to be held by said coin reservoir and to be moved relative to said coin reservoir by said ejector, a member that can move said ejector relative to said coin reservoir, a coin-driving surface on said ejector that can engage a coin that is in register with said outlet end of said coin reservoir and that can respond to movement of said ejector relative to said coin reservoir to force said coin to move relative to said coin reservoir, a stop means that is movable into and out of the path of movement of said coin, said stop means being biased into said path of movement of said coin but being movable out of said path of movement of said coin, said tube having a slot therein, and a pivot for said stop means whereby said stop means rotates as it moves into and out of said path of movement of said coin, said pivot being disposed above the level of and to one side of the leading edge of said stop means, whereby said leading edge of said stop means will move upwardly and sidewardly as said coin is moved against said stop means, said stop means having a portion thereof extending into said slot in said tube and thereby keeping a second coin which is within said coin reservoir and which is abutting the first said coin from moving outwardly of the outer periphery of said coin reservoir, said stop means having a further portion that is contiguous to the first said portion and that inclines away from the axis of said coin reservoir to enable said stop means to rotate about said pivot rather than jam bent coins within said coin reservoir.

6. In a coin dispensing device, a reservoir for coins that has an outlet end, an ejector movably mounted adjacent said outlet end of said coin reservoir, a member that can move said ejector relative to said coin reservoir, a coin-driving surface on said ejector that can engage a coin that is in register with said outlet end of said coin reservoir and that can respond to movement of said ejector relative to said coin reservoir to force said coin to move relative to said coin reservoir, a stop that is movable into and out of the path of movement of said coin, said stop being biased into said path of movement of said coin but being movable out of said path of movement of said coin, and guiding surfaces that hold said stop for reciprocation along a path which is inclined to said path of movement of said coin, whereby said stop moves with said coin but diverges from said path of movement of said coin as it moves out of said path of movement of said coin.

7. In a coin dispensing device, a reservoir for coins that has an outlet end, an ejector movably mounted adjacent said outlet end of said coin reservoir, a coin-receiving surface on said ejector that is movable into and out of register with said outlet end of said coin reservoir, said ejector being formed so all portions thereof which pass beneath said outlet end of said coin reservoir are spaced above the level of said coin-receiving surface a distance less than the thickness of a coin to be held by said coin reservoir and to be moved relative to said coin reservoir by said ejector, a member that can move said ejector relative to said coin reservoir, a fixed coin-driving surface on said ejector that can engage a coin that is resting upon said coin-receiving surface and that is in register with said outlet end of said coin reservoir and that can respond to movement of said ejector relative to said coin reservoir to force said coin to move relative to said coin reservoir, a stop means that is mounted immediately adjacent that side of said outlet end of said coin reservoir past which coins are moved by said coin-driving surface on said ejector, said stop means being movable into and out of the path of movement of said coin, said stop means being biased into said path of movement of said coin but being movable out of said path of movement of said coin, and a stripper that normally is in said path of movement of said coin and is disposed beyond said stop means so a coin which is moved past said side of said outlet end of said coin reservoir will engage said stop means and then engage said stripper, said stripper normally bearing against said ejector to prevent the dispensing of said coin without having said coin engage said stripper, said stripper yielding to permit said coin to pass by it but preventing returning movement of said coin, said stripper including two springy fingers that are normally in the path of movement of said coin and are normally laterally spaced apart a distance less than the diameter of said coin but that can be forced apart by said coin as said coin is driven by said coin-driving surface on said ejector.

8. In a coin dispensing device, a reservoir for coins that has an outlet end, an ejector movably mounted adjacent said outlet end of said coin reservoir, means to move said ejector relative to said outlet end of said coin reservoir to cause said ejector to eject coins from said coin reservoir, a coin-driving surface on said ejector that can engage the edge of a coin in register with said outlet end of said coin reservoir and force said coin to move with said ejector, said ejector having opening means therein at the base of said coin-driving surface that keep dirt from piling up adjacent said coin-driving surface and causing coins to ride upwardly past said coin-driving surface, said coin-driving surface being arcuate and said opening means being generally complementary to said coin-driving surface, said opening means extending along the greater portion of the length of said coin-driving surface to keep the base of said coin-driving surface substantially free of piled-up dirt which could cause coins to rise upwardly and ride over said coin-driving surface, said opening means extending generally transversely of the direction of movement of said ejector.

9. In a coin-dispensing device, an ejector that has a leading edge and that has a face disposed rearwardly of said leading edge, a coin-driving surface on said ejector that can engage the edge of a coin which is resting on said face and force said coin to move with said ejector, a projection on said ejector that extends upwardly from said face and is spaced from said coin-driving surface and that is intermediate said coin-driving surface and said leading edge of said ejector, said projection being spaced from said coin-driving surface a distance less than the diameter of said coin and said projection underlying said coin and providing two points of support for said coin, said projection coacting with a point on said face of said ejector immediately adjacent said coin-driving surface to provide three-point support for a coin which is resting on said face and is to be moved by said ejector.

10. In a coin-dispensing device, an ejector, a coin-driving surface on said ejector that can engage the edge of a coin and force said coin to move with said ejector, a projection on said ejector, said projection raising one edge of a coin to cause the opposite edge of said coin to abut the base of said coin-driving surface.

11. In a coin-dispensing device, an ejector that has a leading edge, a coin-driving surface on said ejector that can engage the edge of a coin and force said coin to move with said ejector, a ramp-like projection on said ejector that is spaced from said coin-driving surface and that is intermediate said coin-driving surface and said leading edge of said ejector, said ramp-like projection having its highest point adjacent said leading edge of said ejector and inclining from said highest point toward, but stopping short of, said coin-driving surface, said projection raising one edge of a coin to cause the opposite edge of said coin to abut the lower portion of said coin-driving surface.

12. In a money dispensing device, a reservoir for money, an ejector movably mounted adjacent said reservoir, a cam that has a rise thereon which is adapted to move said ejector in one direction relative to said reservoir, a spring that is adapted to move said ejector in the opposite direction relative to said reservoir, said ejector responding to movement in said one and in said opposite direction to effect the dispensing of money from said reservoir, and an electric motor to move said cam and thereby enable said rise thereon to move said ejector in said one direction, said cam having said rise thereon interrupted by at least one dwell whereby de-energization of said motor can not enable said spring to move said ejector far enough in said opposite direction to effect the dispensing of money from said reservoir.

13. In a money dispensing device, a reservoir for money, an ejector movably mounted adjacent said reservoir, said ejector having a money-driving surface thereon, a cam that has a rise thereon which is adapted to move said ejector in one direction relative to said reservoir, a spring that is adapted to move said ejector in the opposite direction relative to said reservoir, said ejector responding to movement in said one and in said opposite direction to effect the dispensing of money from said reservoir, and an electric motor to move said rise on said cam toward said ejector and thereby enable said rise to move said ejector in said one direction and to move said rise on said cam away from said ejector to enable said spring to move said ejector in said opposite direction, said cam having said rise thereon interrupted by at least one dwell, said dwell being adjacent that portion of said rise which can move said money-driving surface in said one direction into position adjacent said reservoir whereby de-energization of said motor, whenever said portion of said rise is holding said coin-driving surface adjacent said coin reservoir, can not enable said spring to move said ejector to and past said dwell and thus can not move said ejector far enough in said opposite direction to effect the dispensing of money from said reservoir.

14. In a money dispensing device that has a reservoir, an ejector, an electric motor to drive said ejector, a switch to energize said motor, a motor-driven cam, and a lever that is normally moved by said motor-driven cam during each cycle of operation of said money dispensing device into position to hold said switch closed to energize said motor and is thereafter permitted by said motor-driven cam to move out of switch-holding position, the improvement which comprises a manually-operable lever which is mounted adjacent the first said lever and which is normally in a position wherein it is out of engagement with the first said lever and will thus not interfere with movement of the first said lever by said motor-driven cam and which can be moved to a second position where it can engage the first said lever and hold the first said lever in switch-closing position, thereby causing said motor to run continuously and effect dispensing of all of the money in said reservoir, the first said lever being independent of said motor-driven cam whenever the first said lever is held in said switch-closing position by said manually-operable lever, said manually-operable lever subsequently being movable out of said second position, wherein it is in engagement with the first said lever, and into the first said position to permit the first said lever to move towards said motor-driven cam, so said motor-driven cam and the first said lever can cause said money dispensing device to complete its cycle of operation and then come to rest, said manually-operable lever remaining in the first said position until it is gripped and moved into said second position, said manually-operable lever thereafter remaining in said second position until it is gripped and moved back into the first said position, whereby said manually-operable lever is unmoved by the operation of said coin dispensing device.

15. In a coin dispensing device, a coin reservoir, an ejector that is mounted adjacent said coin reservoir and that can occasionally force the coins in said coin reservoir to rise upwardly as it moves relative to said coin reservoir, means to move said ejector relative to said coin reservoir, an empty switch, and a feeler that is adapted to extend into said reservoir and feel for the presence of coins within said reservoir the improvement which comprises, a support means, a spring means, and a pivot pivot means which is urged into engagement with said support means by said spring means, said pivot means rotatably supporting said feeler to enable said feeler to move into and out of said reservoir, said spring means normally holding said pivot means fixed relative to said support means but being adapted to yield to permit said pivot means to move a short distance upwardly and thereby permit said feeler to move a short distance upwardly as coins within said reservoir are moved upwardly by said ejector and engage said feeler, whereby limited upward movement of coins within said reservoir cannot bend or break said feeler.

16. In a money dispensing device, a reservoir, a fixed pivot, an ejector means that is movable about said pivot relative to said reservoir to effect the dispensing of money from said reservoir, a motor-driven cam means that supplies the force needed to move said ejector means in one direction relative to said reservoir, a spring means that supplies the force needed to move said ejector means in the opposite direction relative to said reservoir, a second fixed pivot, an arm means that is movable relative to said second fixed pivot to cause movement of said ejector means in said one and said opposite directions, said arm means being connected to said ejector means adjacent the first said pivot and receiving said forces from said cam means and from said spring means and applying resultant forces to said ejector means adjacent to first said pivot, whereby said ejector means receives resultant forces rather than direct forces from said cam means and said spring means and is thereby largely free of warping and distorting forces.

References Cited by the Examiner

UNITED STATES PATENTS

| | | | |
|---|---|---|---|
| 212,788 | 3/79 | Casey | 133—5 |
| 708,083 | 9/02 | Schell | 221—238 |
| 1,081,958 | 12/13 | Grey | 133—3 |
| 1,166,499 | 1/16 | Von Barth. | |
| 1,260,382 | 3/18 | Hosking | 133—1 |
| 1,304,323 | 5/19 | Kaye | 221—236 |
| 1,409,172 | 3/22 | Hawley | 133—4 |
| 1,839,946 | 1/32 | Brandt | 133—4 |
| 2,271,397 | 1/42 | McDermott. | |
| 2,359,183 | 9/44 | Wilsey | 194—11 |
| 2,519,357 | 8/50 | Daugherty | 133—3 |
| 2,578,951 | 12/51 | Shaver | 133—5 |
| 2,640,575 | 6/53 | Piano. | |
| 2,724,391 | 11/55 | Fremon | 133—4 |
| 2,728,434 | 12/55 | Fry | 133—5 |
| 2,777,553 | 1/57 | Keefe | 133—4 |
| 2,932,428 | 4/60 | McGranahan | 221—238 |
| 2,990,084 | 6/61 | Probasco | 221—267 |

FOREIGN PATENTS

| | | |
|---|---|---|
| 597,157 | 1/48 | Great Britain. |
| 55,416 | 4/19 | Sweden. |

EVERETT W. KIRBY, *Primary Examiner.*

LAVERNE D. GEIGER, SAMUEL F. COLEMAN, LOUIS J. DEMBO, *Examiners.*